(12) United States Patent
Muhlhoff et al.

(10) Patent No.: US 9,649,883 B2
(45) Date of Patent: May 16, 2017

(54) TIRE WITH IMPROVED TREAD

(75) Inventors: Olivier Muhlhoff, Clermont-Ferrand (FR); Emmanuel Igier, Clermont-Ferrand (FR); Jean-Claude Faure, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 568 days.

(21) Appl. No.: 14/129,033

(22) PCT Filed: Jun. 18, 2012

(86) PCT No.: PCT/EP2012/061568
§ 371 (c)(1),
(2), (4) Date: Feb. 18, 2014

(87) PCT Pub. No.: WO2012/175444
PCT Pub. Date: Dec. 27, 2012

(65) Prior Publication Data
US 2014/0190605 A1      Jul. 10, 2014

Related U.S. Application Data

(60) Provisional application No. 61/521,983, filed on Aug. 10, 2011.

(30) Foreign Application Priority Data

Jun. 23, 2011    (EP) .................................... 11305801

(51) Int. Cl.
*B60C 1/00*      (2006.01)
*B60C 11/00*     (2006.01)

(52) U.S. Cl.
CPC ........ *B60C 1/0016* (2013.04); *B60C 11/0058* (2013.04); *B60C 11/0066* (2013.04); *B60C 2011/0025* (2013.04)

(58) Field of Classification Search
CPC ............. B60C 11/0066; B60C 11/0058; B60C 11/0075; B60C 11/0041; B60C 1/0016; B60C 2011/0025
(Continued)

(56) References Cited

U.S. PATENT DOCUMENTS 5,883,179 A * 3/1999 Kawazoe ................. C08K 9/02
                                                    524/492
6,540,858 B1 * 4/2003 Caretta ................... B60C 11/00
                                                   152/209.5
(Continued)

FOREIGN PATENT DOCUMENTS

EP       1561605 A2      8/2005
EP       2106931 A1     10/2009
(Continued)

OTHER PUBLICATIONS

PCT/EP2012/061568—International Search Report, dated Sep. 19, 2012, 3 pages.

*Primary Examiner* — Michael H Wilson
*Assistant Examiner* — Philip N Schwartz
(74) *Attorney, Agent, or Firm* — Dickinson Wright PLLC

(57) ABSTRACT

A tire comprising a tread portion designed to be worn off during the life of the tire having a radial thickness T, an outer edge and an inner edge, the axial distance between the outer edge and the inner edge defining the axial width L of the tread, the tread comprising four adjacent portions made of a four rubber compounds, wherein the rubber compounds making up the first and third portions are predominantly filled with carbon black filler, wherein the rubber compounds making up the second and fourth portion are pre-
(Continued)

dominantly filled with non carbon black filler, wherein the rubber compounds making up the first and third portions have a value for tan δ at 0° C., at a stress of 0.7 MPa, that is lower than that of the rubber compounds making up the second and fourth portion, and wherein the axial width of the first portion decreases and the axial width of the second portion increases as a function of the distance from the rolling surface of the tread when unworn.

8 Claims, 6 Drawing Sheets

(58) Field of Classification Search
USPC .................................................... 152/209.5
See application file for complete search history.

(56) References Cited

U.S. PATENT DOCUMENTS

| | | |
|---|---|---|
| 2005/0167019 A1 | 8/2005 | Puhala et al. |
| 2009/0242091 A1 | 10/2009 | Puhala et al. |
| 2010/0101694 A1 | 4/2010 | Ubukata et al. |

FOREIGN PATENT DOCUMENTS

| | | | | |
|---|---|---|---|---|
| JP | 325003 A | 2/1991 | | |
| JP | 04133802 A | * 5/1992 | ............. | B60C 11/00 |

\* cited by examiner

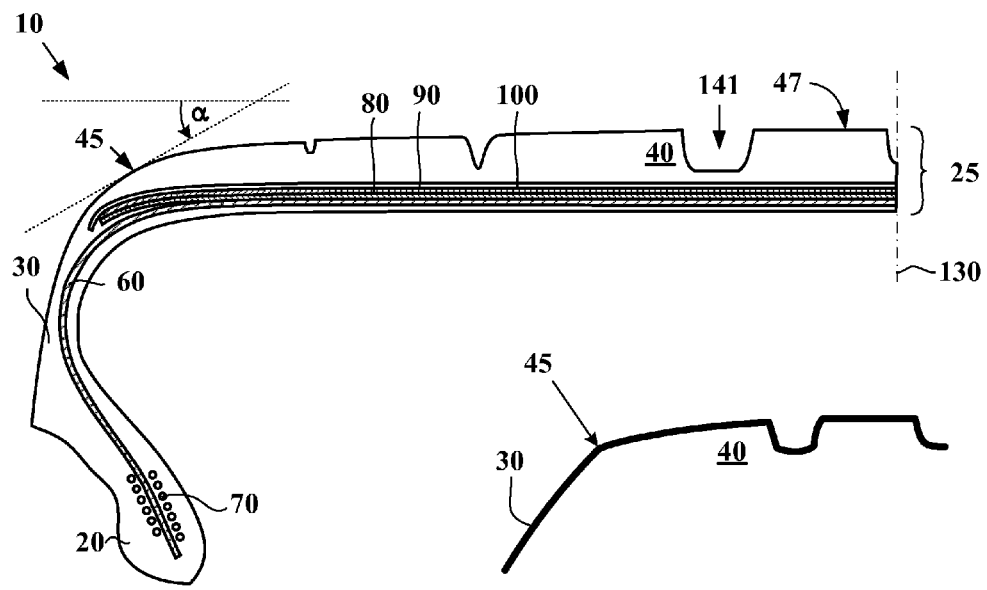
FIG. 3
(PRIOR ART)
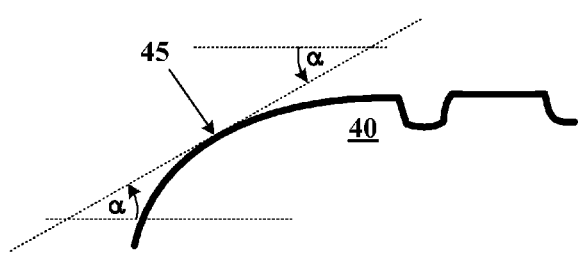
FIG. 5
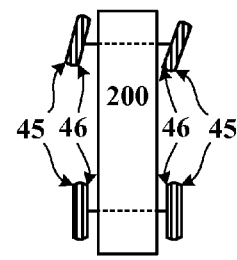
FIG. 6
FIG. 4
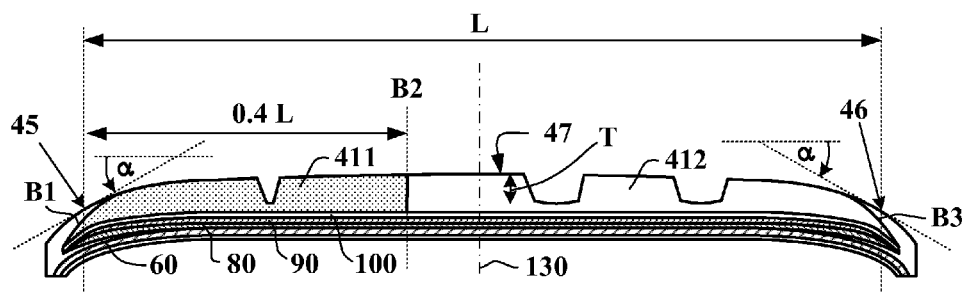
FIG. 7 (PRIOR ART)

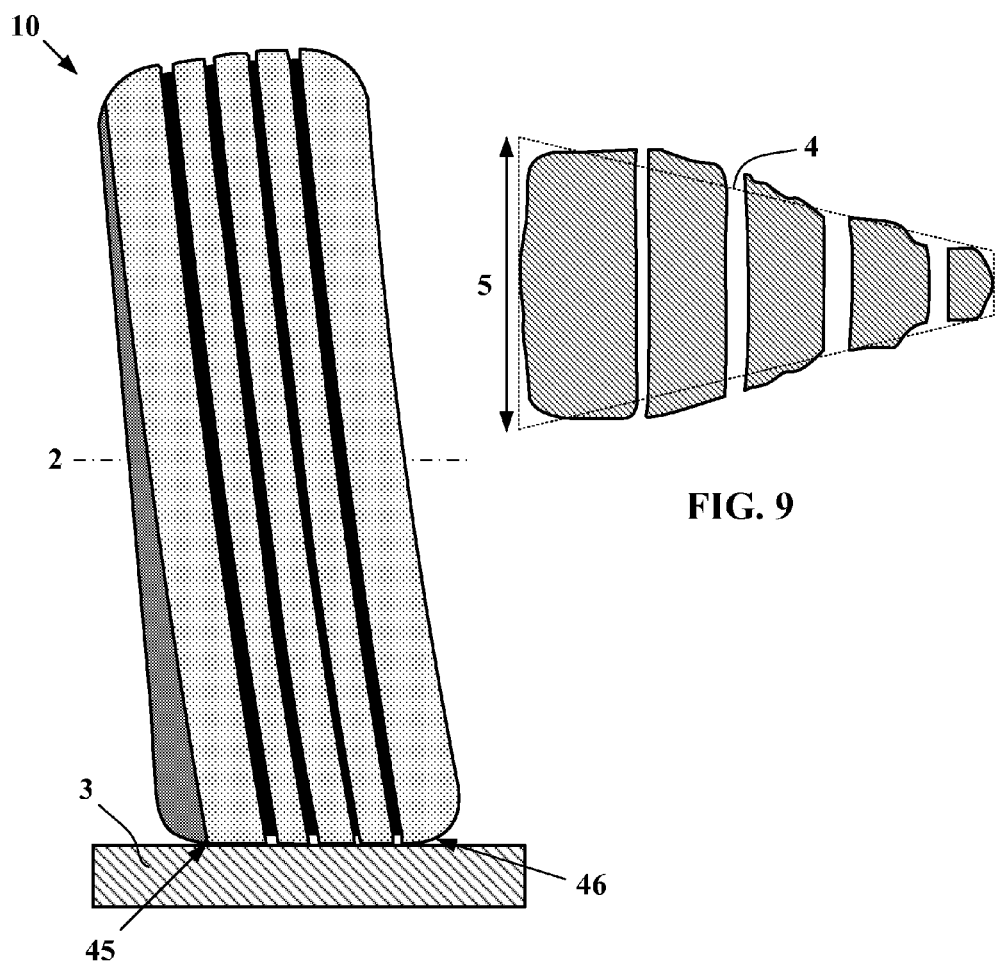
FIG. 8
FIG. 9
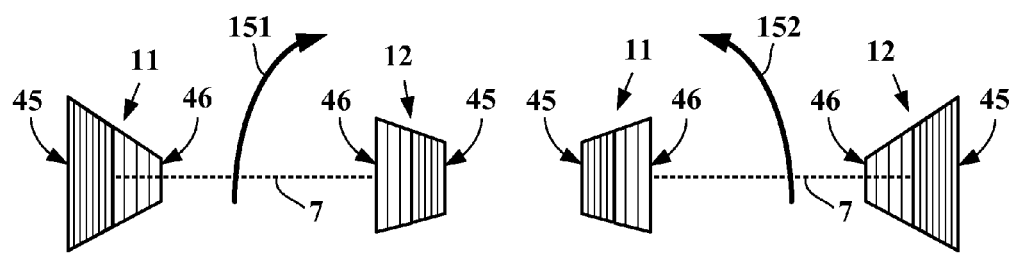
FIG. 10
FIG. 11

TIRE WITH IMPROVED TREAD

This application is a national phase entry of PCT/EP2012/061568, filed Jun. 18, 2012, which claims the benefit of EP11305801.0, filed Jun. 23, 2011 and of U.S. Provisional Application Ser. No. 61/521,983, filed Aug. 10, 2011, the entire contents of each of which are incorporated herein by reference for all purposes.

BACKGROUND

Field

The present invention relates to tires for passenger vehicles. It relates more particularly to tires suited to sporty road driving.

Description of Related Art

The grip that tires have on the ground on which they are rolling is one of the most important features from the point of view of the safety of the driver of a vehicle fitted with tires. It is also of key importance in determining the performance of the vehicle in sporty road driving (i.e., driving that occurs under conditions of speed, acceleration, or cornering that are more demanding than ordinary road or highway conditions). If its tires lose their ability to steer as a result of a lack of grip, the vehicle may suffer from a loss of control.

Of course, a vehicle, even if designed for use in sporty road driving conditions, has to be driven in variable weather conditions and in particular in wet and dry ground conditions. It is, therefore, desirable for the tire to be provided with means that provide good grip on dry ground and on wet ground. In particular, it is possible to adapt at least part of the tread pattern to use on wet ground, for example by providing recesses able to drain away and/or to store water, or by increasing the number of tread pattern edges able to cut through the film of water formed between the tread and the ground. It is also possible to vary the materials of which the tread is made, using rubber compounds more particularly suited to use on wet ground and/or on dry ground. A tread comprising the two types of rubber compound is able to achieve good grip under all circumstances. An example of such a tire is given in European patent application No. 1 308 319.

Under sporty road driving conditions, the tires of a vehicle experience substantial transverse stresses when the vehicle fitted with the tires is cornering. During the corner, the transverse stresses cause, on the contact area where each tire makes contact with the ground on which it is rolling, deformation resulting in a substantially trapezoidal shape. The side of the contact area which is furthest away from the centre of the bend lengthens, while the side of the contact area closest to the centre of the bend shortens.

The "side of the contact area furthest from the centre of the bend" is the side via which the elements of the tread come into contact with the ground in the direction of the rate of drift of the centre of the wheel on which the tire is mounted. For this reason, it is sometimes referred to as "(transverse) leading edge". The opposite side, that is to say the "side of the contact area closest to the centre of the bend" is sometimes referred to as the "(transverse) trailing edge".

This "trapezoidal" deformation alters both the load borne by the various ribs of the tread and the contribution that each makes to the transverse force developed by the tire. For a given load that the tires of the vehicle have to support in a given cornering situation, the ribs that have become lengthened bear a greater share of the total load borne by the tire. The ribs which have shortened bear a correspondingly lower proportion of the total load borne by the tire. For a given transverse force, delivered by one of the tires in a given cornering situation, it follows that the most heavily loaded ribs (in general, those on the side furthest from the centre of the bend) are those which make the greatest contribution to the total transverse force.

Rubber compounds suited for use on wet ground are generally more fragile with respect to the very high thermal and mechanical stresses generated in the contact area of a tire under severe cornering conditions on a dry road surface. If the tread of the tire is provided with portions made of a rubber compound with better grip on dry ground and with portions made of a rubber compound with better grip on wet ground, then it is preferable to ensure that the rubber compound that has better grip on dry ground is placed on the side of the contact area that is furthest from the centre of the bend. Thus, even if the contact area becomes trapezoidal, the tire will maintain good grip on dry ground, that is to say a good ability to develop a high transverse force. Further, because the ground contact pressures are higher on this same side of the contact area (which is the furthest from the centre of the bend), the drainage of the water with which the road surface is wetted is generally rather satisfactory in this part of the contact area. As a consequence, conditions that establish good grip contact and that allow use of a rubber compound with better grip on dry ground are created in this region of the tread. In other words, the tire, in this region, behaves as if it were rolling on dry ground. There is therefore no need to provide in this part of the tread a rubber compound that has better grip on wet ground and of which the performance on dry ground is inferior to that of a rubber compound that has better grip on dry ground. The "Pilot Sport 2" tire commercialised by Michelin is an example of a tire that has such a distribution of rubber compounds within its tread.

In spite of the good performance offered by this tire in terms of grip, there is still an increasing need to improve the compromise between grip on dry ground and grip on wet ground of tires, and more particularly of tires designed for sporty road driving.

SUMMARY

One of the objectives of the present disclosure is, therefore, to provide a tire that provides an improved compromise between grip on dry ground and grip on wet ground, both when the tire is new (unworn) or almost new and when the tire has undergone significant wear.

This objective is achieved using a tire that has a predetermined direction of mounting, in which a portion of that part of the tread that is traditionally reserved for the rubber compounds that have better grip on wet ground is made of a rubber compound that has better grip on dry ground. In other words, a portion of that part of the tread that is situated on that side of the vehicle which faces toward the vehicle when the tire is mounted on the vehicle in said predetermined direction of mounting (that is to say on the "inside" of the tire; the corresponding sidewall commonly bearing the inscription "inside" and/or the opposite sidewall commonly bearing the inscription "outside") is made of a rubber compound that has better grip on dry ground. The beneficial compromise between grip on dry ground and grip on wet ground is maintained as an optimal value as a function of tire wear by astutely changing the axial extent of portions of the tread portions made from rubber compound that has better grip on dry ground and also varying the axial extent of the portion of the tread portions made from rubber compound that has better grip on wet ground. For example, the axial extents of each tread portion can vary with tread depth so that the portion providing better grip on wet ground increases with increasing wear. This maintains good performance with avoiding aquaplaning as the tread becomes worn.

More specifically, the objective is achieved by using a tire designed to be mounted on a mounting rim of a wheel of a vehicle and having a predetermined direction of mounting on the vehicle, wherein the tire comprises a tread having a rolling surface designed to come into contact with a ground when the tire is rolling on the ground, and a tread portion designed to be worn off during the life of the tire, this tread portion having a radial thickness T. The tread, when unworn, has an outer edge and an inner edge, the outer edge being situated on that side of the tire which, when the tire is mounted on the vehicle in said predetermined direction of mounting, faces toward the outside of the vehicle, the inner edge being situated on that side of the tire which, when the tire is mounted on the vehicle in said predetermined direction of mounting, faces toward the vehicle. The axial distance between the outer edge and the inner edge defines the axial width L of the tread.

The tread comprises, in any radial section, a first portion made of at least one first rubber compound, wherein the first portion extends from a first axial boundary position to a second axial boundary position. The axial distance of this first axial boundary position from the inner edge is greater than or equal to 95% of the of the axial width L of the tread.

The tread further comprises, in any radial section, a second portion that is axially adjacent to the first portion and made of at least one second rubber compound. The second portion extends from a third axial boundary position to a fourth axial boundary position.

According to a particular embodiment, said third axial boundary position coincides with said second axial boundary position, at least for some values of DR, or even for all values of DR, where DR is the radial distance from the rolling surface of the unworn tread. According to another embodiment, said third axial boundary position and said second axial boundary position delimit an incision in the tread which separates said first and second portions of the tread. In this embodiment, the third axial boundary position may also coincide with the second axial boundary position for some values of DR.

The tread further comprises, in any radial section, a third portion that is axially adjacent to the second portion and made of at least one third rubber compound. The third portion extends from a fifth axial boundary position to a sixth axial boundary position, wherein the axial distance between the sixth axial boundary position and the outer edge is greater than or equal to 80% and smaller than or equal to 90% of the axial width L of the tread for DR=0.2·T.

According to a particular embodiment, said fifth axial boundary position coincides with said fourth axial boundary position, at least for some values of DR, or even for all values of DR. According to another embodiment, said fifth axial boundary position and said fourth axial boundary position delimit an incision in the tread which separates said second and third portions of the tread. In this embodiment, the fourth axial boundary position may also coincide with the fifth axial boundary position for some values of DR.

Finally, the tread comprises, in any radial section, a fourth portion that is axially adjacent to the third portion and made of at least one fourth rubber compound. The fourth portion extends from a seventh axial boundary position to an eighth axial boundary position, the axial distance of said eighth axial boundary position from the outer edge being greater than or equal to 95% of the of the axial width L of the tread.

According to a particular embodiment, said seventh axial boundary position coincides with said sixth axial boundary position, at least for some values of DR, or even for all values of DR. According to another embodiment, said seventh axial boundary position and said sixth axial boundary position delimit an incision in the tread which separates said third and fourth portions of the tread. In this embodiment, the sixth axial boundary position may also coincide with the seventh axial boundary position for some values of DR.

In a particular embodiment, the first, second, third and fourth portions extend over the entire circumference of the tire and have an intersection with the rolling surface when the tire is new or, at the latest, when the tread wear has reached 10%.

Said at least one first rubber compound and said at least one third rubber compound contain at least one elastomer and at least one reinforcing filler containing a carbon black, the carbon black representing a percentage PN1 greater than or equal to 50% and less than or equal to 100% of the weight of all of the reinforcing filler, and wherein said at least one second rubber compound and said at least one fourth rubber compound contain at least one elastomer and at least one reinforcing filler, optionally including a carbon black, the carbon black representing a percentage PN2 greater than or equal to 0% and less than or equal to 50% of the weight of all of the reinforcing filler.

Said at least one first rubber compound and said at least one third rubber compound have a value for tan $\delta$ at 0° C., at a stress of 0.7 MPa, that is lower than that of said at least one second rubber compound and said at least one fourth rubber compound.

In a tire according to the invention, at least one of the following conditions (C1) and (C2) is met:

Condition (C1): the first portion has, in any radial section, an axial width that decreases as a function of the radial distance DR from the rolling surface of the unworn tread, the second axial boundary position varying as a function of the radial distance DR, such that the axial distance between the second axial boundary position and the outer edge is greater than or equal to 20% and smaller than or equal to 40% of the axial width L of the tread for DR=0.2·T, and greater than or equal to 10% and smaller than or equal to 38% of the axial width L of the tread for DR=0.8·T, provided that the second axial boundary position for DR=0.2·T is axially inside by at least 2% of the axial width L of the tread with respect to the second axial boundary position for DR=0.8·T.

Condition (C2): the second portion has, in any radial section, an axial width that increases as a function of the radial distance DR from the rolling surface of the unworn tread, the fourth axial boundary position varying as a function of the radial distance DR, such that the axial distance between the fourth axial boundary position and the outer edge is greater than or equal to 50% and smaller than or equal to 60% of the axial width L of the tread for DR=0.2·T, and greater than or equal to 52% and smaller than or equal to 70% of the axial width L of the tread for DR=0.8·T, provided that the fourth axial boundary position for DR=0.2·T is axially inside by at least 2% of the axial width L of the tread with respect to the fourth axial boundary position for DR=0.8·T. For example, the desired increasing axial width can be provided where the third axial boundary position coincides with the second axial boundary position for at least some values of DR, or where the third axial boundary position delimits an incision in the tread which separates said first and second positions of the tread, e.g., a circumferential incision. In a particular embodiment, the third axial boundary position is either constant with DR or varies such that the third axial boundary position at DR=0.2·T is axially outside the third axial boundary position at DR=0.8·T.

Preferably, both conditions (C1) and (C2) are met simultaneously.

In a tire according to the invention, the axial width of the first portion having relatively good grip on dry ground decreases and the axial width of the second portion having better grip on wet ground increases as the tread wears off. This is advantageous because as the tread wears off, aquaplaning phenomena become more problematic (water storage and evacuation become more difficult when the depth of the incisions in the tread diminishes), whereas the tire grip on dry ground does not significantly change with tire wear. In a tire according to the invention, therefore, the relative proportion—in the rolling surface—of rubber compounds having better grip on wet ground increases as the tire wears, so that the overall tire grip compromise is improved, and this allows the tire to have both better performance at low speed (where aquaplaning does not appear) and quicker recovery after aquaplaning thanks to the greater part of compound having better grip on wet ground.

According to one advantageous embodiment, said portions made of said at least one first, second, third and fourth rubber compounds all have an intersection with the rolling surface when the tire is new. Thus, the tire is able to develop its full potential, and make use of the properties provided by each of these rubber compositions right from first use.

According to another advantageous embodiment, said sixth axial boundary position varies as a function of the radial distance DR from the rolling surface of the unworn tread, such that the axial distance of the sixth axial boundary position from the outer edge is greater or equal to 70% and smaller or equal than 95% of the axial width L of the tread for DR=0.8·T, provided that the difference between (a) the sixth axial boundary position for DR=0.2·T and (b) the sixth axial boundary position for DR=0.8·T, is greater than or equal to 2% of the axial width L of the tread.

According to yet another advantageous embodiment, said at least one third rubber compound is identical to said at least one first rubber compound and said at least one fourth rubber compound is identical to said at least one second rubber compound. This embodiment has the notable advantage of simplifying the manufacture of the tire and the control of stocks of rubber compound at the factory.

According to a fourth advantageous embodiment, said at least one first rubber compound and said at least one third rubber compound have a value for tan δ at 10° C., at a stress of 0.7 MPa, that is higher (preferably higher by at least 0.05) than that of said at least one second rubber compound and said at least one fourth rubber compound. As a matter of fact, the value tan δ of the rubber compound at 10° C., at a stress of 0.7 MPa, neatly characterizes the grip on dry ground.

According to another advantageous embodiment, the difference between the value of tan δ for said at least one first rubber compound and said at least one second rubber compound is greater than or equal to 0.05, wherein the difference between the value of tan δ for said at least one second rubber compound and said at least one third rubber compound is greater than or equal to 0.05, and wherein the difference between the value of tan δ for said at least one third rubber compound and said at least one fourth rubber compound is also greater than or equal to 0.05. This applies to both the tan δ values at 0° C. and the tan δ values at 10° C., as the case may be.

Of course, it is possible, and even desirable to combine two or more of the embodiments described.

BRIEF DESCRIPTION OF THE DRAWINGS

FIG. 3 depicts, in radial cross section, a quarter of a tire according to the prior art.

FIGS. 4 and 5 are schematic diagrams that illustrate how the axial edge of a tread is determined.

FIG. 6 is a schematic diagram illustrates the terms "inner edge" and "outer edge" of a tread.

FIG. 7 schematically depicts the crown of a tire according to the prior art.

FIG. 8 schematically depicts the deformation of a tire when it experiences substantial transverse stresses.

FIG. 9 schematically illustrates the trapezoidal distortion of the contact area of such a tire.

FIGS. 10 and 11 schematically illustrate the trapezoidal distortion of the contact area of two tires mounted on one and the same axle of a vehicle, depending on the direction in which the vehicle is cornering.

Each of FIGS. 12 to 18 schematically depicts the crown of a tire according to an embodiment of the invention.

Figure 19:
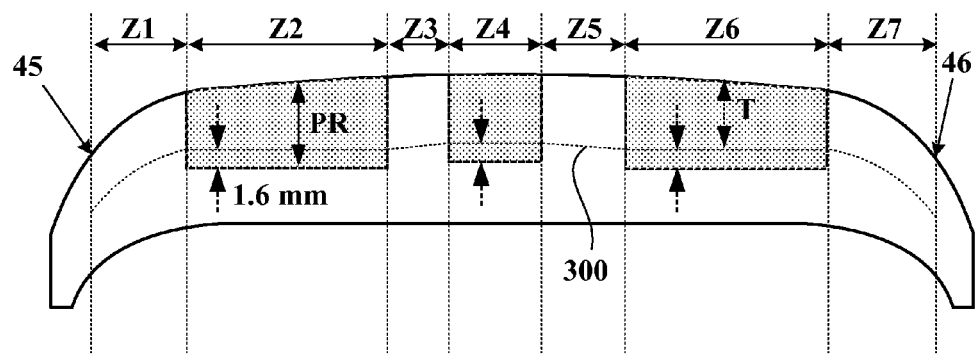

FIG. 19 schematically illustrates the notion of the radial thickness of the tread portion to be worn off during the life of the tire.

DETAILED DESCRIPTION OF SPECIFIC EMBODIMENTS

When using the term "radial" in connection with tires it is appropriate to make a distinction between various different uses that the person skilled in the art makes of this word. Firstly, the expression refers to a radius of the tire. It is in that sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further from the axis of rotation of the tire than is the point P4. Progress "radially inward (or outward)" will mean progress toward smaller (or larger) radii. In terms of radial distances, it is this sense of the word that applies also.

By contrast, a thread or a reinforcement is said to be "radial" when the thread or the reinforcing elements of the reinforcement make an angle greater than or equal to 80° and less than or equal to 90° with the circumferential direction. As used herein, the term "thread" is to be understood in a very general sense of the word and encompasses threads in the form of monofilaments, multifilaments, a cord, a yarn or an equivalent assembly, irrespective of the material of which the thread is made or of the surface treatment it has undergone to enhance its bonding with the rubber.

Finally, a "radial cross section" or "radial section" here means a cross section or a section on a plane which contains the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further from the median plane of the tire than is the point P8. The "median plane" of the tire is the plane which is perpendicular to the axis of rotation of the tire and which lies equal distances from the annular reinforcing structures of each bead.

Two portions A and B of the tread are said to be "axially adjacent" if there is at least one axial direction D connecting a point P1 of portion A and a point P2 of portion B so that the segment of direction D connecting points P1 and P2 does not intersect any portion of the tread other than portions A and B. The segment of direction D connecting points P1 and P2 may, however, have an intersection with an incision (groove, sipe, . . . ) separating portions A and B of the tread without this being detrimental to A and B being considered to be "axially adjacent". In other words, two axially adjacent portions are positioned axially side by side, either in direct contact or separated by incisions only (but not by other tread portions).

A "circumferential" direction is a direction perpendicular both to a radius of the tire and to the axial direction. A "circumferential section" is a section on a plane perpendicular to the axis of rotation of the tire.

As used herein, the term "rolling surface" means all the points on the tread of a tire that can come into contact with the ground when the tire is rolling in its normal manner.

The expression "rubber compound" denotes a compound of rubber containing at least one elastomer and at least one filler.

"Wear level" of a tire tread means the ratio between the radial thickness that the tread has lost due to wear and the radial thickness of the tread portion that the tread is intended to lose before having to be changed or retreaded. In most tires there are wear indicators provided at the bottom of grooves that indicate that the tread has lost all the thickness it is intended to lose before replacement, so that it becomes apparent that the tire has to be changed or retreaded. A wear level of 25% means that the tread has lost a quarter of the rubber composition that can be worn away before changing (or retreading) becomes necessary. The wear level is generally expressed as a percentage; at a given moment not all the zones of the tread necessarily have the same wear level ("uneven wear").

The "radial thickness T" of the tread portion designed to be worn off during the life of the tire is determined as follows. For each axial position, one considers the radial depth PR (in mm) of the deepest incision that is found over the circumference of the tire—the radial thickness T at this axial position (in mm) is defined to be PR-1.6. This is because there are regulations that require a tire to have a minimum incision depth of 1.6 mm. If, for a given axial position, there is no incision over the whole circumference of the tire but there are axial positions on both sides (axially) of the axial position under consideration where incisions are found, then the radial thickness at the axial position under consideration is defined to be the interpolated thickness of the closest axial positions on both sides where there are incisions. If, for a given axial position, there is no incision over the whole circumference of the tire but there are axial positions axially inside the axial position under consideration where incisions are found, then the radial thickness at the axial position under consideration is defined to be identical to thickness of the closest axial positions axially inside it where there are incisions. See also FIG. 19.

It will be appreciated that there is a direct link between the wear level and the radial thickness T of the tread portion designed to be worn off during the life of the tire. Locally, a wear level of X % is reached when X % of the thickness T have been worn off.

As used herein, the term "trapezium" means a quadrilateral having two parallel sides, i.e., as a synonym for the term "trapezoid."

To make the description of the variants shown with the figures easier to read, the same references are used to denote elements that have identical structures.

Figure 1:
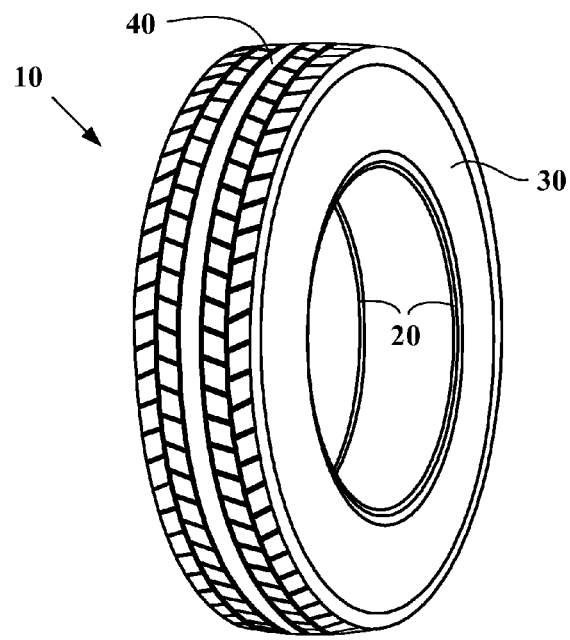
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inward, and two beads 20 radially inside of the sidewalls 30.

Figure 2:
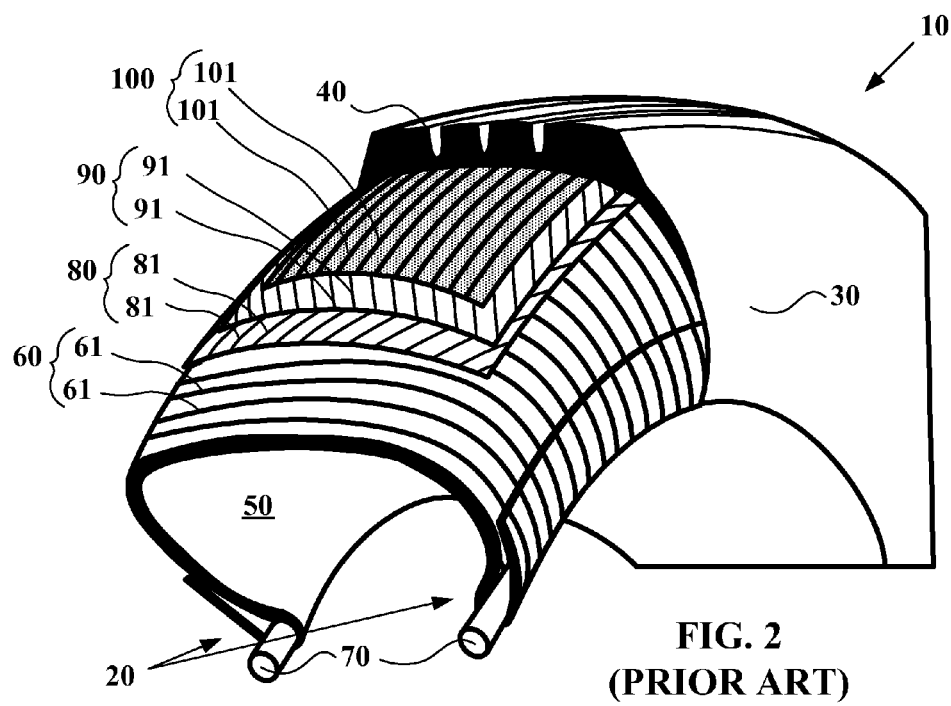
FIG. 2 depicts a partial cut-away perspective view of a tire according to the prior art.

FIG. 2 schematically depicts a partial perspective view of a tire 10 according to the prior art and illustrates the various components of the tire. The tire 10 comprises a carcass reinforcement 60 made up of threads 61 coated with rubber compound, and two beads 20 each comprising annular reinforcing structures 70 which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced with thread-like reinforcing elements 81 and 91 which are parallel within each layer and cross from one layer to the next, making angles ranging between 10° and 70° with the circumferential direction. The tire further comprises a hooping reinforcement 100, arranged radially on the outside of the crown reinforcement, this hooping reinforcement being formed of circumferentially directed spiral-wound reinforcing elements 101. A tread 40 is laid on the hooping reinforcement; it is this tread 40 that provides contact between the tire 10 and the road surface. The tire 10 depicted is a "tubeless" tire: it comprises an "inner liner" 50 made of a rubber compound impervious to the inflation gas, covering the interior surface of the tire.

FIG. 3 schematically depicts, in radial cross section, one quarter of a reference tire 10 of the "Pilot Sport 2" type commercialised by Michelin. The tire 10 comprises two beads 20 designed to come into contact with a mounting rim (not depicted), each bead 20 comprising a plurality of annular reinforcing structures 70. Two sidewalls 30 extend the beads 20 radially outward and meet in a crown 25 comprising a crown reinforcement formed of a first layer of reinforcing elements 80 and of a second layer of reinforcing elements 90, and radially surmounted by a hooping reinforcement 100, which is itself radially surmounted by a tread 40. The median plane 130 of the tire is also indicated, as are rolling surface 47 and circumferential groove 141.

The way in which the axial edges of a tread are determined is illustrated in FIGS. 4 and 5 each of which shows the profile of a portion of the tread 40 and of that part of the sidewall 30 that is adjacent to it. In some tire designs, the transition from tread to sidewall is clear-cut, as in the case depicted in FIG. 4, and determining the axial edge (in this case, an outer axial edge 45) of the tread 40 is straightforward. However, there are tire designs in which the transition between tread and sidewall is continuous. An example is given in FIG. 5. The edge of the tread is then determined as follows. The tangent to the rolling surface of the tire at any point on the rolling surface 47 in the region of transition toward the sidewall is drawn onto a radial cross section of the tire. The axial edge is the point at which the angle α (alpha) between said tangent and an axial direction is equal to 30°. When there are several points at which the angle α (alpha) between said tangent and an axial direction is equal to 30°, it is the radially outmost point that is adopted. In the case of the tire depicted in FIG. 3, the (outer) axial edge 45 has been determined in this way. Whenever axial edges of the tread are referred to herein, what is meant are the axial edges of the tread when unworn.

Each layer of reinforcing elements 80 and 90 comprises thread-like reinforcing elements, coated in a matrix formed of rubber compound. The reinforcing elements of each layer are substantially mutually parallel; the reinforcing elements of the two layers cross from one layer to the next at an angle of about 20°, as is well known to those skilled in the art for tires known as radial tires.

The tire 10 further comprises a carcass reinforcement 60 which extends from the beads 20 through the sidewalls 30 as far as the crown 25. This carcass reinforcement 60 here comprises thread-like reinforcing elements that are directed substantially radially, that is to say that make an angle greater than or equal to 80° and less than or equal to 90° with the circumferential direction.

The carcass reinforcement 60 comprises a plurality of carcass reinforcing elements; it is anchored in the two beads 20 between the annular reinforcing structures 70.

FIG. 7 schematically depicts the crown of a tire designed to be mounted on a mounting rim of a wheel of a vehicle and having a predetermined direction of mounting on the vehicle. The tire comprises a tread having a rolling surface 47 designed to come into contact with the ground (not depicted) when the tire is rolling on the ground, and a tread portion designed to be worn off during the life of the tire, this tread portion having locally a radial thickness T. The tread, when unworn, has an outer axial edge 45 and an inner axial edge 46, the outer axial edge 45 being situated on that side of the tire 10 which, when the tire 10 is mounted on the vehicle 200 in said predetermined direction of mounting, faces toward the outside of the vehicle 200 (see FIG. 6). The inner axial edge 46 being situated on that side of the tire 10 which, when the tire 10 is mounted on the vehicle 200 in said predetermined direction of mounting, faces toward the vehicle (see FIG. 6). The axial distance between the outer axial edge (45) and the inner axial edge (46) defines the axial width L of the tread.

The tread comprises a first portion 411 made of a first rubber compound, wherein the first portion extends from a first axial boundary position B1 to a second axial boundary position B2, and a second portion 412 that is axially adjacent to the first portion 411 and made of a second rubber compound. The second portion extends from the second axial boundary position B2 to a third axial boundary position B3 that is close to the inner edge 46. The first axial boundary position B1 and the third axial boundary position B3 vary slightly as a function of the radial distance DR from the rolling surface 47 whereas the second axial boundary position B2 does not vary as a function of the radial distance DR: the axial distance between the second axial boundary position B2 and the outer edge 45 is equal to 40% of the axial width L of the tread for all values of DR between DR=0 and DR=T. The first portion 411 and the second portion 412 both have an intersection with the rolling surface 47 when the tire is new (unworn). The second rubber compound has a grip on wet ground that is superior to the grip on wet ground of the first rubber compound, and a grip on dry ground that is inferior to the grip on dry ground of the first rubber compound.

FIGS. 8 and 9 schematically depict the deformation of a tire 10 according to the prior art, inflated to 3 bar and heavily loaded (load of 7100 N) when it experiences substantial transverse stresses (camber: −4.4°, rate of sideslip: 3 m/s). FIG. 8 corresponds to a view in the direction of forward travel of the tire. The reference 2 indicates the axis of rotation of the tire 10 and the reference 3 the ground on which the tire 10 is rolling.

FIG. 9 depicts the footprint of the tire 10 on the ground 3 when the tire 10 is undergoing the deformation shown in FIG. 8. To a first approximation, this footprint is in the shape of a trapezium (or trapezoid) 4 the long side 5 of which is the side furthest from the centre of the bend being taken by the vehicle on which the tire 10 is mounted. Because the grip of the tire is greater on dry ground than on wet ground, the transverse forces that the tire may experience are also greater on dry ground and the trapezoidal deformation is more pronounced. It is, therefore, advantageous to ensure that the portion of rubber compound with better grip on dry ground is on that side of the contact area that is furthest from the centre of the bend, as is the case in the tire depicted in FIG. 7. By providing a portion made of rubber compound with better grip on wet ground on that side of the contact area that is closest to the centre of the bend, an advantageous compromise can be reached between the grip of the tire on dry ground and on wet ground.

In defining a tire according to the invention, a distinction has been made between that side of the tire which, when the tire is mounted on the vehicle in its predetermined direction of mounting, faces toward the outside of the vehicle (i.e., away from the vehicle), and that side of the tire that faces toward the inside of the vehicle when the tire is mounted on the vehicle in its predetermined direction of mounting. In the previous paragraph, by contrast, the physical effects have been explained with reference to the sides furthest from and closest to the centre of the bend. Of course, these distinctions do not correspond to one another, because reference to the centre of the bend depends on the direction of the bend (whether the vehicle is cornering to the left or to the right) whereas the side facing toward the outside of the vehicle and the side facing in toward the vehicle do not depend on this. This apparent difficulty may be explained using FIGS. 10 and 11.

FIG. 10 illustrates the trapezoidal deformation of the contact area of two tires 11 and 12 mounted on one and the same axle 7 of a vehicle, viewed upward from the ground on which the tires are rolling. The case being considered is a left-hand bend (when considered from the point of view of the driver of the vehicle), that is to say a bend in the direction indicated using the arrow 151. The tires 11 and 12 have been mounted in their predetermined directions of mounting: the inner edges 46 of their treads are on the side facing in toward the body of the vehicle (the body is not depicted), and the outer edges 45 facing toward the outside of the vehicle. Strictly speaking, the situation is optimized only for the tire 11 because the rubber compound with better grip on dry ground, which is on the outer edge 45 side, is on the side furthest from the centre of the bend. By contrast, for the tire 12, the rubber compound with better grip on dry ground is on the side closest to the centre of the bend. As has been depicted in FIG. 11, the situation reverses when the driver corners to the right (from his point of view) that is to say in the direction indicated using the arrow 152. In FIG. 11 it is the tire 12 that is optimized with respect to the two tires of rubber compound. Whatever the direction of the bend, there is always one tire that "does not suit" or that is not optimized with respect to the two types of tread compound. Because an ordinary vehicle corners as often to the left as to the right, it is none-the-less preferable to favour the tire that is on the side furthest from the centre of the bend, because it is that tire which bears more load and has the greater contact area. It is that tire which, therefore, plays a dominant part in the overall grip of the vehicle. Therefore, such an arrangement corresponds to an advantageous compromise for vehicles that corner as often to the right as to the left. In the infrequent case of a vehicle that turns always in the same direction (for example a vehicle that is exclusively used to cover a circular circuit in just one direction), it would be possible to optimize the mounting of the tires to ensure that the rubber compound with the better grip on dry ground is always on the side furthest from the centre of the bend.

The invention provides a way to improve the overall grip performance still further and, more particularly, to improve the compromise between grip on dry ground and grip on wet ground, both when the tire is new (unworn) or almost new and when the tire has undergone significant wear. This objective is achieved by, inter alia, using a tire that has a predetermined direction of mounting, in which a portion of that part of the tread that has previously been reserved for the rubber compounds that have better grip on wet ground is made of a rubber compound that has better grip on dry ground. In other words, a portion of that part of the tread that is situated on that side of the vehicle which faces toward the vehicle when the tire is mounted on the vehicle in the predetermined direction of mounting (that is to say on the "inside" of the tire; the corresponding sidewall commonly bearing the inscription "inside" and/or the opposite sidewall commonly bearing the inscription "outside") is made of a rubber compound that has better grip on dry ground. The axial extension of this portion changes as a function of the radial distance from the rolling surface of the unworn tread. In addition, as the tire wears, the proportion of the rolling surface where rubber compounds having better grip on dry ground has replaced rubber compounds having better grip on wet ground is decreased.

Figure 12:
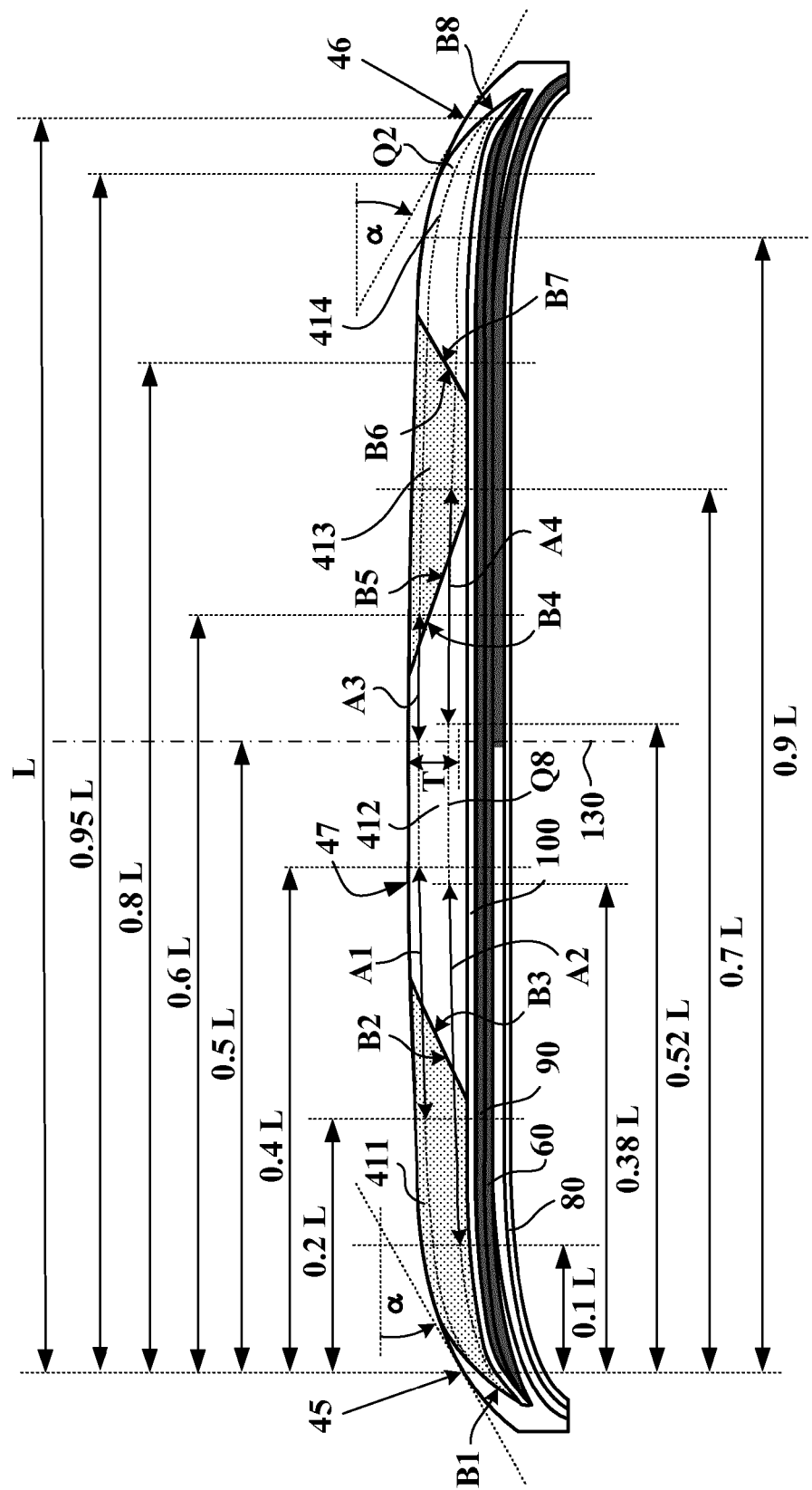

FIG. 12 schematically depicts the crown of a tire according to an embodiment of the invention. This tire is designed to be mounted on a mounting rim of a wheel of a vehicle and has a predetermined direction of mounting on the vehicle. The tire comprises a tread having a rolling surface 47 designed to come into contact with the ground (not depicted) when the tire is rolling on a ground, and a tread portion designed to be worn off during the life of the tire, this tread portion having a radial thickness T.

FIG. 19 schematically illustrates how this radial thickness T, which may vary as a function of the axial position, is determined. For each axial position, one considers the radial depth PR (in mm) of the deepest incision that is found over the circumference of the tire. The tire depicted in FIG. 19 has a central groove (axial zone Z4) and a set of transversal incisions (axial zones Z2 and Z6). The maximum depth of the groove defines the value of PR in axial zone Z4, the maximum depth of the incisions in axial zones Z2 and Z6 the respective values of PR in those zones. The radial thickness T in those zones is defined to be PR (in mm)—1.6. This is because there are regulations that require a tire to have a minimum incision depth of 1.6 mm. If, for a given axial position, such as in axial zones Z3 and Z5, there is no incision, over the whole circumference of the tire, but there are axial positions on both sides (axially) of the axial position under consideration where incisions are found, then the radial thickness at the axial position under consideration is defined to be the interpolated thickness of the closest axial positions on both sides where there are incisions. If, for a given axial position, such as in axial zones Z1 and Z7, there is no incision, over the whole circumference of the tire, but there are axial positions axially inside the axial position under consideration where incisions are found (here axial zones Z2 and Z6, respectively), then the radial thickness at the axial position under consideration is defined to be identical to the thickness of the closest axial positions axially inside it where there are incisions. The resulting curve for the radial thickness T as a function of the axial position is drawn as dotted line 300.

Coming back to FIG. 12, the tread, when unworn, has an outer edge 45 and an inner edge 46, the outer edge 45 being situated on that side of the tire which, when the tire is mounted on the vehicle in said predetermined direction of mounting, faces toward the outside of the vehicle (see FIG. 6), the inner edge 46 being situated on that side of the tire which, when the tire is mounted on the vehicle in said predetermined direction of mounting, faces toward the vehicle (see FIG. 6). The axial distance between the outer edge 45 and the inner edge 46 defines the axial width L of the tread.

The tread comprises a first portion 411 made of a first rubber compound. The first portion 411 extends from a first axial boundary position B1 to a second axial boundary position B2, the axial distance of said first axial boundary position B1 from the inner edge 46 being greater than or equal to 95% of the of the axial width L of the tread.

The tread further comprises a second portion 412 axially adjacent to the first portion 411 and made of a second rubber compound. The second portion 412 extends from a third axial boundary position B3 to a fourth axial boundary position B4. In the embodiment of FIG. 12, the second axial boundary position B2 and the third axial boundary position B3 coincide for all values of DR, where DR is the radial distance from the rolling surface 47 of the unworn tread.

The tread further comprises a third portion 413 axially adjacent to the second portion 412 and made of a third rubber compound. The third portion 413 extends from a fifth axial boundary position B5 to a sixth axial boundary position B6. The axial distance between the sixth axial boundary position B6 and the outer edge 45 is equal to 83% of the axial width L of the tread for DR=0.2·T. In the embodiment of FIG. 12, the fifth axial boundary position B5 and the fourth axial boundary position B4 coincide for all values of DR.

Finally, the tread comprises a fourth portion 414 axially adjacent to the third portion 413 and made of a fourth rubber compound. The fourth portion 414 extends from a seventh axial boundary position B7, which is the embodiment shown in FIG. 12, coincides with the sixth axial boundary position B6 for all values of DR, to an eighth axial boundary position B8. The axial distance of the eighth axial boundary position from the outer edge 45 is greater than or equal to 95% of the of the axial width L of the tread for all values of DR.

The first, second, third and fourth portions 411-414 each extend over the entire circumference of the tire and have an intersection with the rolling surface 47 when the tire is new.

Generally speaking, in a tire according to the invention, at least one of the following conditions (C1) and (C2) is met, wherein each condition in fact has four sub-conditions: (1) to (4) and (1') to (4'), respectively:

Condition (C1): (1) the first portion has, in any radial section, an axial width that decreases as a function of the radial distance DR from the rolling surface of the unworn tread, (2) the second axial boundary position B2 varies as a function of the radial distance DR [in more mathematical terms, B2=B2(DR)], such that the axial distance between the second axial boundary position B2 and the outer edge 45 is greater than or equal to 20% and smaller than or equal to 40% of the axial width L of the tread for DR=0.2·T (indicated by dashed line Q2), and (3) greater than or equal to 10% and smaller than or equal to 38% of the axial width L of the tread for DR=0.8·T (indicated by dashed line Q8), provided that (4) the second axial boundary position B2 for DR=0.2·T is axially inside by at least 2% of the axial width L of the tread with respect to the second axial boundary position B2 for DR=0.8·T [in more mathematical terms, B2(0.2·T)−B2(0.8·T)≥0.02·L]. Sub-conditions (2) and (3) have been visualised in FIG. 12 by means of the double arrows A1 and A2. In order to satisfy sub-condition (2), the intersection of the second axial boundary position B2 and line Q2 has to lie on arrow A1; in order to satisfy sub-condition (3), the intersection of the second axial boundary position B2 and line Q8 has to lie on arrow A2.

Condition (C2): (1') the second portion has, in any radial section, an axial width that increases as a function of the radial distance DR from the rolling surface of the unworn tread, (2') the fourth axial boundary position B4 varying as a function of the radial distance DR [in more mathematical terms, B4=B4(DR)], such that the axial distance between the fourth axial boundary position B4 and the outer edge is greater than or equal to 50% and smaller than or equal to 60% of the axial width L of the tread for DR=0.2·T, and (3') greater than or equal to 52% and smaller than or equal to 70% of the axial width L of the tread for DR=0.8·T, provided that (4') the fourth axial boundary position B4 for DR=0.2·T is axially inside by at least 2% of the axial width L of the tread with respect to the fourth axial boundary position B4 for DR=0.8·T [in more mathematical terms, B4(0.8·T)−B4(0.2·T)≥0.02·L]. Sub-conditions (2') and (3') have been visualised in FIG. 12 by means of the double arrows A3 and A4. In order to satisfy sub-condition (2'), the intersection of the fourth axial boundary position B4 and line Q2 has to lie on arrow A3; in order to satisfy sub-condition (3'), the intersection of the fourth axial boundary position B4 and line Q8 has to lie on arrow A4.

Both conditions (C1) and (C2) are satisfied for the tire of FIG. 12. The first portion 411 has, in any radial section, an axial width that decreases as a function of the radial distance DR from the rolling surface 47 of the unworn tread. The second axial boundary position B2 varies as a function of the radial distance DR, such that the axial distance between the second axial boundary position B2 and the outer edge 45 is equal to 30% of the axial width L of the tread for DR=0.2·T, and equal to 24% of the axial width L of the tread for DR=0.8·T. Thus the second axial boundary position B2 for DR=0.2·T is axially inside by 6% of the axial width L of the tread with respect to the second axial boundary position B2 for DR=0.8·T. Thereby, condition (C1) as defined above is satisfied in this tire.

Moreover, the second portion 412 has, in any radial section, an axial width that increases as a function of the radial distance DR from the rolling surface 47 of the unworn tread. The fourth axial boundary position B4 varies as a function of the radial distance DR, such that the axial distance between the fourth axial boundary position B4 and the outer edge 45 is equal to 58% of the axial width L of the tread for DR=0.2·T, and equal to 66% of the axial width L of the tread for DR=0.8·T. Thus the fourth axial boundary position B4 for DR=0.2·T is axially inside by 8% of the axial width L of the tread with respect to the fourth axial boundary position B4 for DR=0.8·T. Thereby, condition (C2) as defined above is also satisfied in this tire.

FIGS. 13 to 16 show four more embodiments of a crown of a tire according to embodiments of the invention. Table I lists the axial distances between the various axial boundary positions B2 to B7 and the outer edge 45 (as per cents of the axial width L of the tread) for the embodiments of FIGS. 12 to 14.

TABLE I

Figure 13:
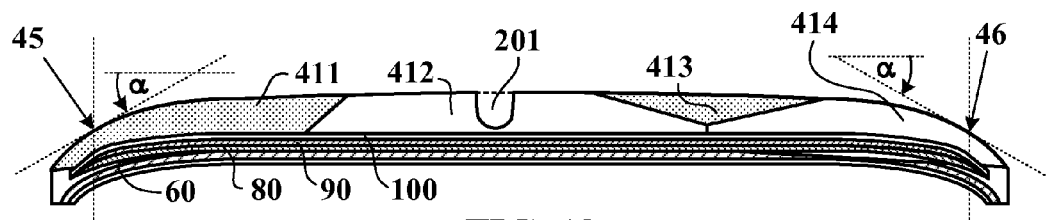
Figure 14:
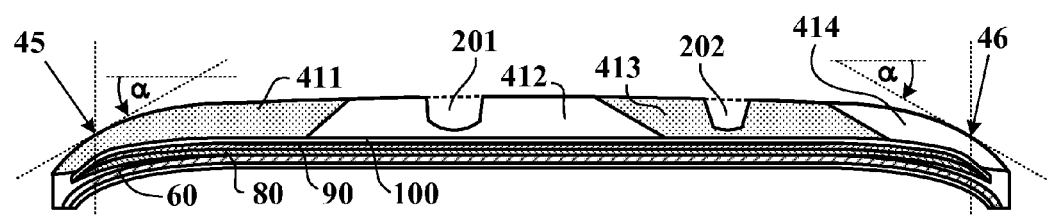

|  | DR | FIG. 12 | FIG. 13 | FIG. 14 |
|---|---|---|---|---|
| B2 = B3 | 0.2 · T | 30% | 27% | 27% |
|  | 0.8 · T | 24% | 24% | 24% |
| B4 = B5 | 0.2 · T | 58% | 59% | 59% |
|  | 0.8 · T | 66% | 67% | 64% |
| B6 = B7 | 0.2 · T | 83% | 81% | 85% |
|  | 0.8 · T | 78% | 74% | 91% |

The crown of the tire depicted in FIG. 13 is similar to the crown depicted in FIG. 12 and has similar advantages; the essential difference consists in the fact that portion 413 disappears before the tread is completely worn off. So when the tread is worn off most of the rolling surface is made of rubber compounds that have better grip on wet ground.

The crown of the tire depicted in FIG. 14 is different from the crown depicted in FIGS. 12 and 13 in that the axial width of portion 413 increases when the tire wears off. Its advantage over the crown of FIG. 13 is that the risk of portion 413 being detached from portions 412 and 414 is reduced.

When the crown comprises grooves (as most crowns indeed do; the tire of FIG. 12 has been drawn without grooves for the sake of clarity only) and when adjacent portions are separated by such grooves, then the axial boundary positions of adjacent portions may not always coincide. This is illustrated in FIGS. 15 and 16.

Figure 15:
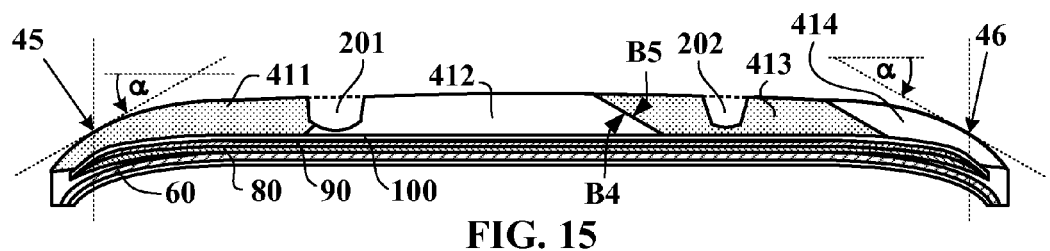

FIG. 15 shows a tread where a groove 201 is provided axially between the first portion 411 and the second portion 412. Therefore, condition (C1) is not fulfilled. However, condition (C2) is still satisfied by the fourth axial boundary position B4 (which coincides with the fifth axial boundary position B5).

Figure 16:
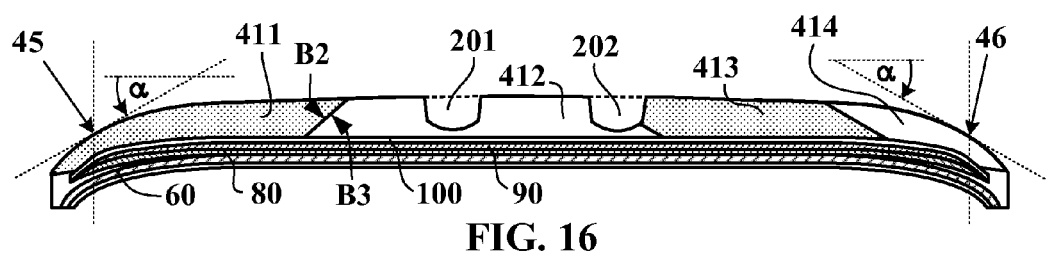

FIG. 16 shows an embodiment where condition (C1) is satisfied by the second axial boundary position B2 (which coincides with the third axial boundary position B3) whereas condition (C2) is fulfilled although a groove 202 is provided axially between the second portion 412 and the third portion 413.

Figure 17:
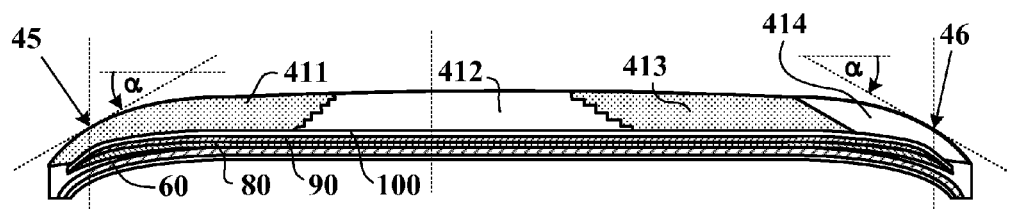
Figure 18:
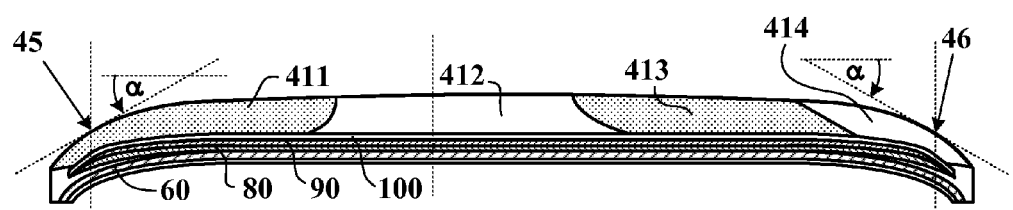

When the tread of a tire according to an embodiment of the invention is obtained by extrusion, the boundaries between adjacent portions will, as a rule, be rectilinear in radial section, such as in FIGS. 12 to 16. This is, however, not an essential feature of a tire according to the invention. As shown in FIG. 17, it is possible to change the axial width of some or all the portions stepwise. This is particularly easy to obtain when the tread is produced by superposing rubber strips. It is also possible to arrange the portions so that the boundaries between adjacent portions have more complex shapes in radial section, as portion 412 in FIG. 17. The particular shape of portion 412 in this embodiment results in a sudden increase of the wet grip when the tire wear is advanced. In this embodiment, the stepwise boundary can be approximated by a smooth curve, e.g., connecting the midpoints of each horizontal portion of the steps. Such a smooth curve approximation will vary as a function of radial distance DR as explained above for FIG. 12. In FIG. 18, the boundaries between adjacent portions are curvilinear in radial section. Nevertheless, either C1 or C2, or both, is satisfied.

In a tire according to embodiments of the invention, the first rubber compound and the third rubber compound are compounds that have good grip on dry ground. They contain at least one elastomer and at least one reinforcing filler containing a carbon black, the carbon black representing a percentage PN1 greater than or equal to 50% and less than or equal to 100% of the weight of all of the reinforcing filler.

The second rubber compound and the fourth rubber compound are compounds that have good grip on wet ground. They contain at least one elastomer and at least one reinforcing filler, possibly including a carbon black, the carbon black representing a percentage PN2 greater than or equal to 0% and less than or equal to 50% of the weight of all of the reinforcing filler.

Moreover, the first rubber compound and the third rubber compound have a value for tan δ at 0° C., at a stress of 0.7 MPa, that is lower than that of the second rubber compound and the fourth rubber compound at the same temperature and stress conditions.

Table II gives, by way of example, compositions of rubber compounds that can be used in tires according to the invention. The composition is given in pce ("percent elastomer") that is to say in parts by weight for 100 parts by weight of elastomer.

TABLE II

|  | Compound with better grip on dry ground | Compound with better grip on wet ground |
| --- | --- | --- |
| SBR Elastomer [1] | 100 | 100 |
| N 234 [2] | 100 | — |
| Silica | — | 100 |
| TESPT coupling agent (Degussa Si 69) | — | 8.0 |
| Plasticizer [3] | 50 | 50 |
| Anti-ozone wax C32 ST | 1.5 | 1.5 |
| Antioxidant (6PPD) [4] | 2.0 | 2.0 |
| Diphenylguanidine (DPG) | — | 1.7 |
| ZnO | 1.8 | 1.8 |
| Stearic acid | 2.0 | 2.0 |
| Sulphur | 1.3 | 1.3 |
| Accelerator (CBS) | 1.95 | 1.95 |

Notes for Table II:
[1] SSBR with 40% styrene, 48% 1-4 trans polybutadiene groups
[2] Carbon black series 230 (ASTM)
[3] TDAE ("treated distillate aromatic extract") oil
[4] N-(1,3-dimethylbutyl)-N'-phenyl-p-phenylenediamine The rubber compounds are preferably based on at least one diene elastomer, one reinforcing filler and a crosslinking system.

What is meant by a "diene" elastomer (or interchangeably rubber) is, in the known way, an elastomer derived at least in part from (i.e. a homopolymer or a copolymer of) diene monomers, that is to say monomers bearing two carbon-carbon double bonds, conjugated or otherwise. The diene elastomer used is preferably chosen from the group consisting of polybutadienes (BR), natural rubber (NR), synthetic polyisoprenes (IR), styrene butadiene copolymers (SBR), isoprene-butadiene copolymers (BIR), isoprene-styrene copolymers (SIR), butadiene-styrene-isoprene copolymers (SBIR) and blends of these elastomers.

One preferred embodiment is to use as the diene elastomer an "isoprene" elastomer, that is to say a homopolymer or copolymer of isoprene, or in other words, a diene elastomer chosen from the group consisting of natural rubber (NR), synthetic polyisoprenes (IR), the various copolymers of isoprene and blends of these elastomers.

The isoprene elastomer is preferably natural rubber or a synthetic polyisoprene of the cis-1,4 type. Of these synthetic polyisoprenes, use is preferably made of polyisoprenes that have a cis-1,4 bond content (mol %) in excess of 90%, or more preferably still, in excess of 98%. According to other preferred embodiments, the diene elastomer may consist, in full or in part, of another diene elastomer such as, for example, an SBR (E-SBR or S-SBR) elastomer used in combination or otherwise with another elastomer for example of the BR type.

The rubber composition may also contain all or some of the additives conventionally employed in the rubber matrices used for the manufacture of tires, such as, for example, reinforcing fillers such as carbon black or inorganic fillers such silica, coupling agents for inorganic fillers, anti-aging agents, antioxidants, plasticizers or extender oils, whether the latter are of aromatic or non-aromatic nature (notably oils that are only very slightly aromatic or non-aromatic, for example of the naphthene or paraffin type, with a high or preferably low viscosity, MES or TDAE oils, plasticizing resins with a high $T_g$ in excess of 30° C.), agents that improve the processability of the compositions in the green state, tackifying resins, a crosslinking system based either on sulphur or sulphur donors and/or peroxides, accelerators, vulcanization activators or retarders, anti-reversion agents, methylene acceptors and donors such as, for example, HMT (hexamethylenetetramine) or H3M (hexamethoxymethylmelamine), reinforcing resins (such as resorcinol or bismaleimide), known adhesion promoting systems of the metal salt type, for example, notably cobalt or nickel salts.

The compositions are desirably manufactured in appropriate mills, e.g., using two successive phases of preparation well known to those skilled in the art, namely a first phase of thermomechanical work or kneading (the so-called "non-productive" phase) at high temperature, up to a maximum temperature of between 110° C. and 190° C., preferably between 130° C. and 180° C., followed by a second phase of mechanical work (the so-called "productive" phase) down to a lower temperature, typically of less than 110° C., during which finishing stage the crosslinking system is incorporated.

By way of example, the non-productive phase is conducted in a single thermomechanical step lasting a few minutes (for example between 2 and 10 min) during which all the required basic ingredients and other additives, apart from the crosslinking or vulcanizing system, are introduced into an appropriate mixer such as a conventional internal mixer. Once the mixture thus obtained has cooled, the vulcanizing system is then incorporated with it in an external mixer such as an open mill kept at a low temperature (for example between 30° C. and 100° C.). This is then blended (productive phase) for a few minutes (for example for between 5 and 15 min).

Vulcanizing (or curing) may be performed in the known way at a temperature generally between 130° C. and 200° C., preferably under pressure, for a sufficient length of time which may vary, for example, between 5 and 90 min depending in particular on the curing temperature, on the vulcanizing system adopted and on the vulcanization dynamics of the composition considered.

Table III gives the properties of the rubber compounds the composition of which is given in Table I

TABLE III

|  | Compound with better grip on dry ground | Compound with better grip on wet ground |
| --- | --- | --- |
| tan δ at 0° C., at 0.7 MPa | 0.76 | 0.88 |
| tan δ at 10° C., at 0.7 MPa | 0.69 | 0.58 |

These properties are measured with a viscoanalyser (Metravib VA4000), in accordance with standard ASTM D 5992-96. The response of a test specimen of vulcanized composition (a cylindrical test specimen 4 mm thick and 400 mm² in section) subjected to simple alternating sinusoidal shear stresses at a frequency of 10 Hz, during a temperature sweep between 0° and 100° C., under a fixed stress of 0.7 MPa, is recorded, particularly the value of tan δ observed at 0° C. and the values of tan δ observed at 10° C.

It will be recalled that, as is well known to those skilled in the art, the value of tan δ at 0° C. is representative of the potential to grip on wet ground: the higher tan δ at 0° C., the better the grip. The values of tan δ at temperatures higher than 10° C. are representative of the hysteresis of the material and of the potential to grip on dry ground.

To return to the compounds the composition of which is given in Table II, it may be seen that the second composition has a value of tan δ at 0° C. (imposed stress 0.7 MPa) that is higher by comparison with the first composition, indicating that its grip on wet ground will be superior; and has a value of tan δ at 10° C. that is lower by comparison with the first composition, indicating that the grip on dry ground would be inferior.

Tests were carried out using a Porsche 997 fitted with Pilot Super Sport tires, size 245/35 R20 (on the front) and 295/30 R20 (on the rear). A tire according to the invention and equipped with a tread as depicted in FIG. 14 was compared against a reference tire equipped with a tread as depicted in FIG. 7. The rubber compounds of Table I were used. The tires according to the invention saved an average of 1 second per lap (on the Nardo (Italy) "handling" circuit with a circuit length of 6.2 km) on dry ground, at the expense of just 0.2 seconds per lap on wet ground. These improved times were backed by the subjective assessment of the drivers who reported better grip on dry ground and substantially unchanged grip on wet ground. The trials were repeated at a wear level close to 80%: significantly better grip on wet ground was reported. The invention therefore provides a better compromise between grip on dry ground and grip on wet ground at different levels of wear.

The invention claimed is:

1. A tire adapted to be mounted on a mounting rim of a wheel of a vehicle and having a predetermined direction of mounting on the vehicle, wherein the tire comprises a tread having a rolling surface adapted to come into contact with a ground when the tire is rolling on the ground, and a tread portion adapted to be worn off during the life of the tire, this tread portion having a radial thickness T, wherein the tread, when unworn, has an outer edge and an inner edge, the outer edge being situated on that side of the tire which, when the tire is mounted on the vehicle in said predetermined direction of mounting, faces toward the outside of the vehicle, the inner edge being situated on that side of the tire which, when the tire is mounted on the vehicle in said predetermined direction of mounting, faces toward the vehicle, the axial distance between the outer edge and the inner edge defining the axial width L of the tread, the tread comprising, in any radial section:

a first portion made of at least one first rubber compound, wherein the first portion extends from a first axial boundary position (B1) to a second axial boundary position (B2), the axial distance of said first axial boundary position from the inner edge being greater than or equal to 95% of the of the axial width L of the tread, a second portion axially adjacent to the first portion and made of at least one second rubber compound, wherein the second portion extends from a third axial boundary position (B3) to a fourth axial boundary position (B4), a third portion axially adjacent to the second portion and made of at least one third rubber compound, the third portion extending from a fifth axial boundary position (B5) to a sixth axial boundary position (B6), wherein the axial distance between said sixth axial boundary position and the outer edge is greater than or equal to 80% and smaller than or equal to 90% of the axial width L of the tread for DR=0.2·T, where DR is the radial distance from the rolling surface of the unworn tread, and a fourth portion axially adjacent to the third portion and made of at least one fourth rubber compound, the fourth portion extending from a seventh axial boundary position (B7) to an eighth axial boundary position (B8), the axial distance of said eighth axial boundary position from the outer edge being greater than or equal to 95% of the of the axial width L of the tread, wherein said first, second, third and fourth portions each extend over the entire circumference of the tire and each have an intersection with the rolling surface when the tire is new or, at the latest, when the tread wear has reached 10%, wherein said at least one first rubber compound and said at least one third rubber compound contain at least one elastomer and at least one reinforcing filler containing a carbon black, the carbon black representing a percentage PN1 greater than or equal to 50% and less than or equal to 100% of the weight of all of the reinforcing filler, and wherein said at least one second rubber compound and said at least one fourth rubber compound contain at least one elastomer and at least one reinforcing filler, possibly including a carbon black, the carbon black representing a percentage PN2 greater than or equal to 0% and less than or equal to 50% of the weight of all of the reinforcing filler, wherein said at least one first rubber compound and said at least one third rubber compound have a value for tan δ at 0° C., at a stress of 0.7 MPa, that is lower than the tan δ of said at least one second rubber compound and said at least one fourth rubber compound at the same temperature and stress conditions, and wherein at least one of the following conditions (C1) and (C2) is met:

(C1) the first portion has, in any radial section, an axial width that decreases as a function of the radial distance DR from the rolling surface of the unworn tread, the second axial boundary position varying as a function of the radial distance DR, such that the axial distance between the second axial boundary position and the outer edge is greater than or equal to 20% and smaller than or equal to 40% of the axial width L of the tread for DR=0.2·T, and greater than or equal to 10% and smaller than or equal to 38% of the axial width L of the tread for DR=0.8·T, provided that the second axial boundary position for DR=0.2·T is axially inside by at least 2% of the axial width L of the tread with respect to the second axial boundary position for DR=0.8·T;

(C2) the second portion has, in any radial section, an axial width that increases as a function of the radial distance DR from the rolling surface of the unworn tread, the fourth axial boundary position varying as a function of the radial distance DR, such that the axial distance between the fourth axial boundary position and the outer edge is greater than or equal to 50% and smaller than or equal to 60% of the axial width L of the tread for DR=0.2·T, and greater than or equal to 52% and smaller than or equal to 70% of the axial width L of the tread for DR=0.8·T, provided that the fourth axial boundary position for DR=0.2·T is axially inside by at least 2% of the axial width L of the tread with respect to the fourth axial boundary position for DR=0.8·T, wherein said at least one first rubber compound and said at least one third rubber compound have a value for tan δ at 10° C., at a stress of 0.7 MPa, that is higher than that of said at least one second rubber compound and said at least one fourth rubber compound.

2. The tire according to claim 1, wherein both conditions (C1) and (C2) are met.

3. The tire according to claim 1, wherein said portions made of said at least one first, second, third and fourth rubber compounds all have an intersection with the rolling surface when the tire is new.

4. The tire according to claim 1, wherein for at least some values of the radial distance DR said second axial boundary position and said third axial boundary position coincide, and/or said fourth axial boundary position and said fifth axial boundary position coincide, and/or said sixth axial boundary position and said seventh axial boundary position coincide.

5. The tire according to claim 1, wherein for at least some values of the radial distance DR said second axial boundary position and said third axial boundary position delimit an incision in the tread, and/or said fourth axial boundary position and said fifth axial boundary position delimit an incision in the tread, and/or said sixth axial boundary position and said seventh axial boundary position delimit an incision in the tread.

6. The tire according to claim 1, wherein said at least one third rubber compound is identical to said at least one first rubber compound and wherein said at least one fourth rubber compound is identical to said at least one second rubber compound.

7. The tire according to claim 1, wherein the difference between the value of tan δ for said at least one first rubber compound and said at least one second rubber compound is greater than or equal to 0.05, wherein the difference between the value of tan δ for said at least one second rubber compound and said at least one third rubber compound is greater than or equal to 0.05, and wherein the difference between the value of tan δ for said at least one third rubber compound and said at least one fourth rubber compound is also greater than or equal to 0.05.

8. The tire according to claim 1, wherein said sixth axial boundary position varies as a function of the radial distance DR from the rolling surface of the unworn tread, such that the axial distance of the sixth axial boundary position from the outer edge is greater or equal to 70% and smaller or equal than 95% of the axial width L of the tread for DR=0.8·T, provided that the difference between (a) the sixth axial boundary position for DR=0.2·T and (b) the sixth axial boundary position for DR=0.8·T, is greater than or equal to 2% of the axial width L of the tread.

* * * * *